(12) United States Patent
Wang et al.

(10) Patent No.: US 8,151,343 B1
(45) Date of Patent: Apr. 3, 2012

(54) METHOD AND SYSTEM FOR PROVIDING AUTHENTICATION CREDENTIALS

(75) Inventors: Henry Shyue-yeong Wang, Mountain View, CA (US); Ananth Uggirala, Mountain View, CA (US); Michele Lynn Sarko, Redwood Shores, CA (US); Chris Quinn, Del Mar, CA (US); Anthony Creed, San Diego, CA (US); Kenichi Mori, Carlsbad, CA (US); Bennett R. Blank, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 694 days.

(21) Appl. No.: 12/112,794

(22) Filed: Apr. 30, 2008

Related U.S. Application Data

(63) Continuation-in-part of application No. 11/830,811, filed on Jul. 30, 2007.

(51) Int. Cl.
G06F 7/04 (2006.01)
(52) U.S. Cl. ........ 726/19; 726/4; 726/5; 726/18; 726/2; 707/784; 707/732; 705/67; 705/72
(58) Field of Classification Search ............ 726/2, 4–5, 726/18–19; 707/732, 784; 705/72, 67
See application file for complete search history.

(56) References Cited

U.S. PATENT DOCUMENTS

| | | | |
|---|---|---|---|
| 7,292,680 B1 | 11/2007 | Simpson | |
| 7,292,723 B2 | 11/2007 | Tedesco et al. | |
| 7,827,204 B2 | 11/2010 | Heinzel et al. | |
| 2004/0030934 A1 | 2/2004 | Mizoguchi et al. | |
| 2004/0230843 A1 | 11/2004 | Jansen | |
| 2005/0134427 A1 | 6/2005 | Hekimian | |
| 2007/0067295 A1 | 3/2007 | Parulski et al. | |
| 2007/0074119 A1 | 3/2007 | Komine et al. | |
| 2007/0094717 A1* | 4/2007 | Srinivasan et al. | 726/5 |
| 2007/0266428 A1 | 11/2007 | Downes et al. | |
| 2007/0277224 A1 | 11/2007 | Osborn et al. | |
| 2008/0046968 A1* | 2/2008 | Cline et al. | 726/2 |
| 2008/0104065 A1 | 5/2008 | Agarwal et al. | |
| 2008/0222710 A1 | 9/2008 | Blagsvedt et al. | |

OTHER PUBLICATIONS

Evaluation of pixel-based steganography and stegodetection methods, Bailey, K.1; Curran, K.; Condell, J., Imaging Science Journal, vol. 52, No. 3, pp. 131-150.*

Automatic seal verification by evaluating positive cost, Horiuchi, T., Fac. of Software & Inf. Sci., Iwate Prefectural Univ., Japan,572-6.*

* cited by examiner

*Primary Examiner* — Thanhnga B Truong
*Assistant Examiner* — Angela Holmes
(74) *Attorney, Agent, or Firm* — Osha • Liang LLP

(57) ABSTRACT

A method for authenticating a user, that includes receiving an account identifier from the user, obtaining a media prompt from an account based on the account identifier, presenting the user with the media prompt and a question prompt, wherein the question prompt references the media prompt, receiving input answering the question prompt, comparing the input with a valid response to determine whether the user is authentic, wherein the valid response requires personal knowledge of the media prompt and the question prompt, and authorizing the user to access a resource when the user is authentic.

18 Claims, 12 Drawing Sheets

METHOD AND SYSTEM FOR PROVIDING AUTHENTICATION CREDENTIALS

CROSS-REFERENCE TO RELATED APPLICATIONS

This application claims benefit under 35 U.S.C. §120 as a continuation-in-part to U.S. patent application Ser. No. 11/830,811, filed on Jul. 30, 2007, entitled "System and Method for User Authentication" in the names of Chris Quinn, Anthony Creed, Kenichi Mori, and Bennett R. Blank and commonly owned by the same assignee.

BACKGROUND

Authentication is the act of establishing or confirming the identity of a user. One common use of authentication is access control. Access control attempts to detect and exclude unauthorized users from accessing a resource that is intended to be used only by authorized individuals. For example, resources that access control may be used to protect include a file, an application, a web site, an account of an individual, a software program, a physical object (e.g., a computer system, a physical facility, a safe, a room, a filing cabinet), and/or anything else that needs to be secure. Access to the resource is therefore controlled by an authentication process to establish, with some degree of confidence, the identity of the user attempting to access the resource.

Authentication is often achieved using one or more tests. When performing one or more of these tests, a user must submit the correct response(s) to be authenticated and access the resource. The correct response(s) may be initially defined when the user registers (e.g., creates a user profile) for access to the resource. Known authentication tests include passwords, personal identification numbers (PINs), and biometrics (e.g., fingerprints, voice recognition, retinal scans).

SUMMARY

In general, in one aspect, the invention relates to a method for authenticating a user, that includes receiving an account identifier from the user, obtaining a media prompt from an account based on the account identifier, presenting the user with the media prompt and a question prompt, wherein the question prompt references the media prompt, receiving input answering the question prompt, comparing the input with a valid response to determine whether the user is authentic, wherein the valid response requires personal knowledge of the media prompt and the question prompt, and authorizing the user to access a resource when the user is authentic.

In general, in one aspect, the invention relates to a system for authenticating a user, that includes an account associated with an account owner and stored in a repository, wherein the account is linked to a media prompt, a question prompt, and a valid response, and wherein the question prompt references the media prompt and the valid response is pre-selected by the account owner responsive to the question. The system also includes an authentication manager accessing the account, executing on a processor, and configured to receive an account identifier from the user, obtain the media prompt from the account based on the account identifier, present the user with the media prompt and the question prompt, receive input answering the question prompt, compare the input with the valid response to determine whether the user is authentic, wherein the valid response requires personal knowledge of the media prompt and the question prompt, and authorize the user to access a resource when the user is authentic.

In general, in one aspect, the invention relates to a user interface displayed on a display device, the user interface that includes a media prompt, a question prompt referencing the media prompt, and an input box for receiving input from a user viewing the display device, wherein the input is compared with the valid response to determine whether the user is authentic, wherein the valid response requires personal knowledge of the media prompt and the question prompt, wherein the user is authorized to access a resource when the user is authentic.

In general, in one aspect, the invention relates to a computer system for authenticating a user, that includes a processor, a memory, a storage device, and software instructions stored in the memory. The software instructions enable the computer system under control of the processor to receive an account identifier from the user, obtain a media prompt from an account based on the account identifier, present the user with the media prompt and a question prompt, wherein the question prompt references the media prompt, receive input answering the question prompt, compare the input with a valid response to determine whether the user is authentic, wherein the valid response requires personal knowledge of the media prompt and the question prompt, and authorize the user to access a resource when the user is authentic.

In general, in one aspect, the invention relates to a computer readable medium that includes computer readable program code for authenticating a user, the computer readable program code for causing the computer system to receive an account identifier from the user, obtain a media prompt from an account based on the account identifier, present the user with the media prompt and a question prompt, wherein the question prompt references the media prompt, receive input answering the question prompt, compare the input with a valid response to determine whether the user is authentic, wherein the valid response requires personal knowledge of the media prompt and the question prompt, and authorize the user to access a resource when the user is authentic.

Other aspects of the invention will be apparent from the following description and the appended claims.

DETAILED DESCRIPTION

Figure 1:
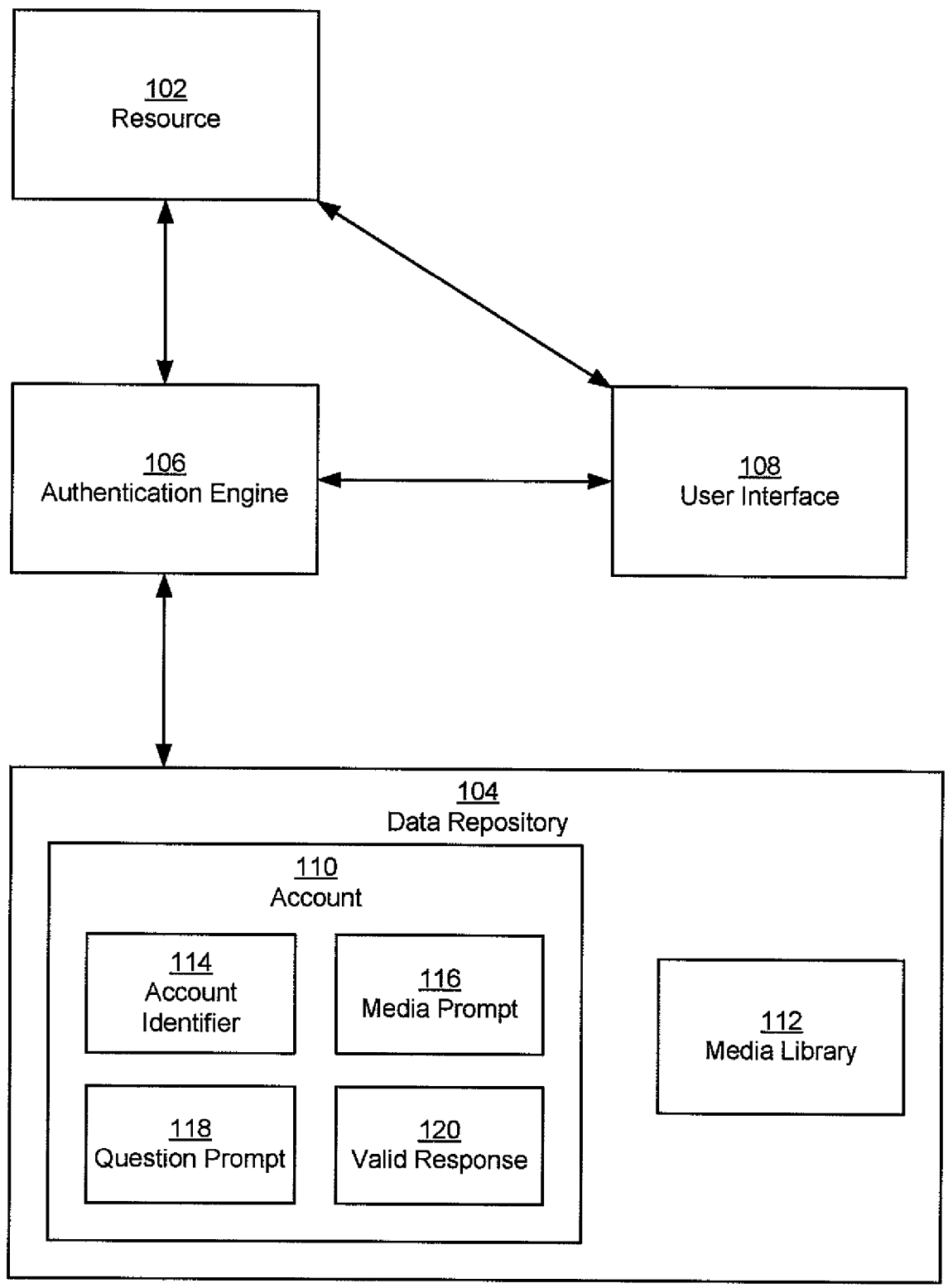
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for authenticating a user prior to granting the user access to a resource. The authentication establishes the user's identity as a specific authorized individual who is allowed access to the resource. In particular, embodiments of the invention present a media prompt and a question prompt to the user. The question prompt asks a question about the media prompt. In order to answer the question correctly, personal knowledge of the media prompt is required. Only a specific authorized individual knows the personal knowledge to answer the question. Thus, the answer that the user provides indicates whether the user is authorized to access the resource.

FIG. 1 shows a schematic diagram of a system in accordance with one or more embodiments of the invention. As shown in FIG. 1, the system has several components including a resource (102), a data repository (104), an authentication engine (106), and a user interface (108). Each of these components is described below.

In one or more embodiments of the invention, a resource (102) is any securable physical or virtual object. Specifically, the resource (102) is the object to be protected so that only the appropriate individual(s) can access the resource. For example, the resource (102) may be a file, an application, a web site, a hardware device, a physical facility, a safe, a room, a physical filing cabinet, a financial account, a computer storage account, an account accessible by a kiosk, a home security system, a telephone, and/or anything else that needs to be secure and, therefore, requires user authentication. Example applications include financial software (e.g., accounting software, tax preparation software, payroll software, banking software), medical provider software, insurance claim software, home inventory software, productivity software, document management software, e-commerce software, and/or other software requiring authentication.

In one or more embodiments of the invention, the data repository (104) is any type of storage unit (e.g., a file system, database, collection of tables, or any other storage mechanism) for data. Further, the data repository (104) may include multiple different storage units, which may or may not be of the same type or located at the same physical site. For example, a portion of the data repository (104) may be on an identity server while another portion is distributed across the Internet. In one or more embodiments of the invention, the data repository (104), or a portion thereof, is secure.

In one or more embodiments of the invention, the data repository (104) stores one or more accounts (110) and a media library (112). In one or more embodiments of the invention, an account (110) provides credentials for an account owner. The account owner may be a specific individual or a group (e.g., a company, organization, or other such group). The account (110) includes information for detecting whether a user is the specific individual, a member of the group that is authorized to access the resource, or a malicious individual or computer attempting to gain access to the resource. In one or more embodiments of the invention, the account may be a dedicated to the function of authenticating the user. In particular, the account (110) may be an access account that includes only data for authentication.

Alternatively, the account (110) may include the resource (102) that the user is attempting to access. For example, if the resource (102) is the account owner's privileged data (e.g., financial data, personal information, or other such data), then the privileged data may be stored with the data for authentication.

In one or more embodiments of the invention, a single account owner may have multiple accounts (110) in accordance with one or more embodiments of the invention. Each of the multiple accounts (110) may pertain to a different resource (102). Those skilled in the art, having the benefit of this detailed description, will appreciate that the requirements for authenticating a user may differ among resources. In other words, some resources may have very strict authentication requirements, with multiple levels of authentication, while other resources may have more lenient authentication requirements, with only a single level of authentication. Accordingly, in one or more embodiments of the invention, each account may include the authentication requirements of the resource to which the account pertains.

In one or more embodiments of the invention, an account (110) includes data, such as an account identifier (114), a media prompt (116), a question prompt (118), and a valid response (120). The account identifier (114) is an identifier for the account that may be used by the user to specify which account includes the credentials for authentication. Thus, the account identifier (114) may be a series of symbols, numbers, and/or letters that identify the account (110). For example, the account identifier (114) may be an email address of the account owner, a social security number, a login name, or any other type of meaningful identifier.

The media prompt (116) plus the question prompt (118) is a reminder (or other thought triggering mechanism) of the valid response (120). In one or more embodiments of the invention, the media prompt (116) and the question prompt (118) are presented to the user to remind (or trigger a thought of) the user of the valid response (120). In one or more embodiments of the invention, the media found in the media prompt (118) is primarily, if not completely, non-textual. For example, the media may be an image, a group of images that together form a story, a video, a sound clip (e.g., music, a song, a sound of an event), or a collection of media components. If the media is an image, then the image may be a photograph generated by a digital camera, a scanned photograph, a photograph from a web site, a drawing, a motion picture frame, a document page, a slide from a slide show, word art, a map, a map with another image superimposed on the map, or any other such image. Those skilled in the art will appreciate that media corresponding to images or video may include text. Further, in one or more embodiments of the invention, the media may exist in any accessible file format.

In one or more embodiments of the invention, the media may be associated with one or more tags used for categorizing the media (discussed below). Each tag may be a single attribute associated with the media. For example, each tag may describe content presented within the media (e.g., family members, vacation destinations, pets, schools, landmarks, cars, athletes, celebrities, political figures, etc.). In one or more embodiments of the invention, the one or more tags associated with a media are embedded as metadata within the media.

In one or more embodiments of the invention, the question prompt (118) asks a contextual question related to the media prompt (116). The question may be a personal question that few, if any, individuals outside of the account owner would know the answer. For example, the question may be directed towards the contents and/or characteristics of the media presented in the media prompt (116) as the media prompt relates to the account owner (e.g., "Where was this photograph taken?", "Why does the child look so sad in this video?", "What family member is taking the photograph?", "What brand of camera is being used to take the photograph?", "Where did this story take place?", "What is the source(s) of this image?", "What did I purchase on the day shown in the video?", "What does this song remind me of?", "When did you first hear the sound clip?", "What happened at this intersection?", and other such questions). Thus, the question prompt (118) asks a question whose answer is not apparent to individuals outside of those authorized to use the account. The valid response (120) is the correct answer to the question posed by the question prompt (118).

In one or more embodiments of the invention, the valid response (120) may be an exact answer (i.e., precisely the same) or a template answer (i.e., essentially the same). In particular, for a template answer, words/phrases in the valid response (120) that are essential in answering the question are assigned point values. The more essential the word/phrase in answering the question, the greater point value assigned to the word/phrase. The template answer may also include alternatives (e.g. common abbreviations for the word/phrase) which are assigned an equal point value as the word/phrase. Therefore, an answer from a user can be assigned a score based on the points for each correct word/phrase in the answer. A score above a certain threshold indicates that the user is authentic.

The media prompt (116), question prompt (118), and/or valid response (120) may be stored in the account (110) by reference to another storage location. The storage location that is referenced may or may not be in the account (110). Thus, for example, if the media prompt (116) is stock media (discussed below), then the media prompt (116) may be stored once and referenced by multiple accounts. In one or more embodiments of the invention, both the question prompt (118) and the valid response (120) may be embedded as metadata within the media prompt (116).

Continuing with the data repository (104), the media library (112) includes stock media in accordance with one or more embodiments of the invention. Stock media is generic, predefined, and/or default media that are available to be used as the media prompt. Specifically, the stock media is not specific to the account owner of the account. Rather the stock media may be used and associated with multiple different accounts. For example, the stock media may include stock photos, sound clips, or videos that are provided by a third party. The personal knowledge required for the user to answer the question prompt about the stock media may be how the stock media relates to the account owner. For example, the stock media may be a greatest hit song of 1990 and the question may be "Where was I when I first heard this song?" Only the account owner may know that the account owner was in a bar in the Czech Republic in 1996 when the account owner first heard the song played.

Continuing with FIG. 1, an authentication engine (106) includes functionality to control access to the resource (102) in one or more embodiments of the invention. Specifically, the authentication engine (106) includes functionality to obtain the question prompt (118) and the media prompt (116) for presentation to the user. The authentication engine (106) further includes functionality to receive and compare the answer with a valid response (120) to authenticate the user. The authentication technique provided by the authentication engine (106) may be based on the authentication requirements of the resource (102).

In one or more embodiments of the invention, the authentication engine (106) is operatively connected to a user interface (108). The user interface (108) includes functionality to interact with the user. Specifically, the user interface (108) includes functionality to present the media prompt (116) and the question prompt (118) for the user. The user interface (108) may include a field, such as a text box, and a submit button to receive an answer from the user. The user interface (108) may include a web page, an authentication window, a pop-up box, or any other type of component for authenticating a user. The user interface (108) may also include functionality to allow the user to interact with the resource (102).

In one or more embodiments of the invention, the user interface (108) executes on a computing device (not shown). The computing device is a device that includes functionality to process instructions. For example the computing device may be a kiosk, a computer system, a home security system, a server, mainframe, desktop personal computer (PC), laptop, personal digital assistant (PDA), television, cable box, satellite box, telephone, mobile phone, or any other type of computing device.

One skilled in the art will appreciate that different configurations of the system may be used. For example, components of the system or a portion of the components may be located on the same device (e.g., a server, mainframe, desktop personal computer (PC), laptop, personal digital assistant (PDA), television, cable box, satellite box, kiosk, telephone, mobile phone, etc.) or may be located on separate devices connected by a network (e.g., the Internet), with wired and/or wireless segments. Below are only a few examples of the different configurations for presenting the user interface (108).

In a first example, the user interface (108) may be connected to the authentication engine (106) and/or the resource (102) via a network (not shown). For example, the authentication engine (106) may be on a server that is separate from the computing device on which the user interface (108) executes. Similarly, the resource (e.g., an online account) may be local to the computing device on which the user interface (108) executes. In such example, the user interface (108) may be a web page shown on a local computing device of the user that is provided by the authentication engine (106). Once the user is authenticated, the user interface may require a token, cookie or other code to access the online account. Alternatively, the authentication engine (106), in the example, may be interposed between the resource (102) and the user interface (108). At each interaction with the resource (102), the authentication engine (106) may perform a check to determine whether the user is authenticated.

In another example, the user interface (108) may exist on the resource (102) with the authentication engine (106). Specifically, the resource (102) may be the computing device on which the authentication engine executes. For example, in the scenario in which the resource is a security system or cable box, the user interface (108) may be displayed on a screen of the resource. The authentication engine (106) may also execute on the resource or may have a client that executes on the resource. In the example, the authentication may allow the user to change the settings of the resource (e.g., disarm the alarm, adjust parental controls, order movies, and other such settings).

In another example, the user interface (108) and the authentication engine (106) may exist on the same computing device that is separate from the resource (102). For example, the resource (102) may be a physical filing cabinet, an entire physical building, or a room within the building. In the example, the computing device on which the user interface (108) and the authentication engine (106) executes may be an electronic lock for the resource (102).

As shown above, by way of example, the components of the system for presenting the user interface (108) may exist in virtually any configuration. The configuration that is used may be based on the type of resource (102) and/or the desired level of authentication.

Figure 2:
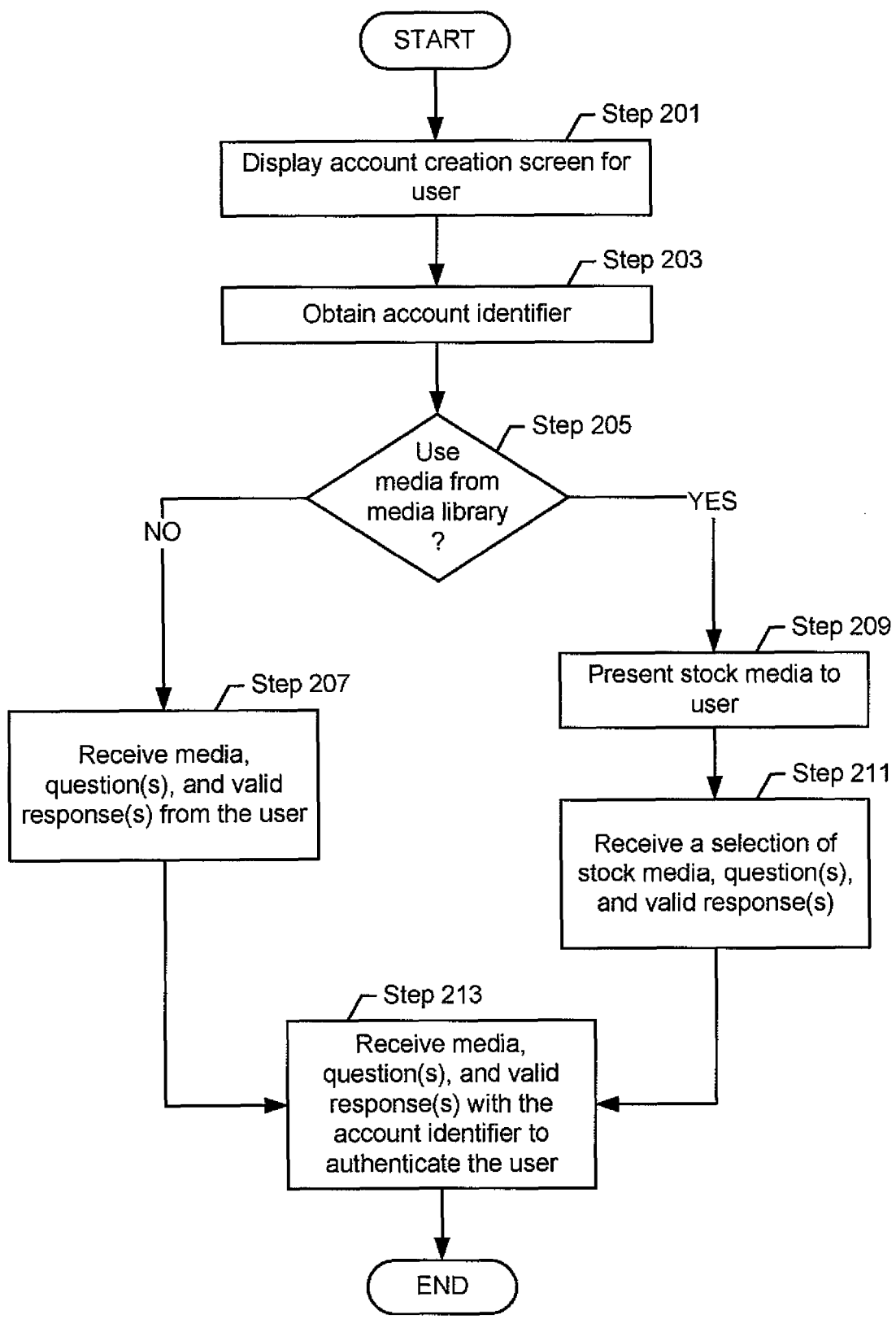
FIGS. 2-3 show flowcharts in accordance with one or more embodiments of the invention.
Figure 3:
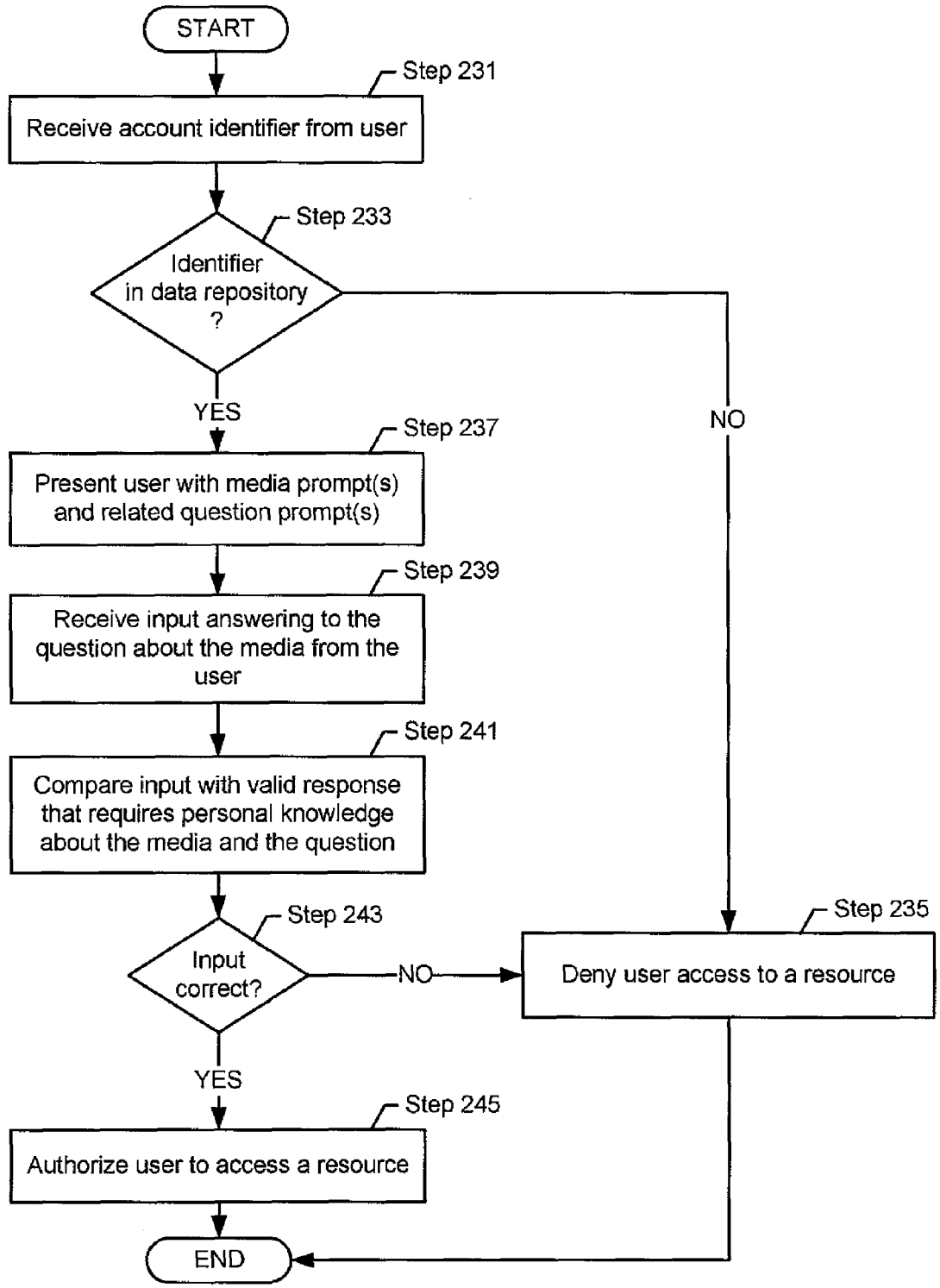

FIGS. 2-3 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. In addition, steps such as store and communication acknowledgements have been omitted to simplify the presentation.

FIG. 2 shows a flowchart for creating an account in accordance with one or more embodiments of the invention. Initially, an account creation screen is displayed for the account owner (Step 201). In one or more embodiments of the invention, the account creation screen allows the access account owner to create a new account and/or store the media prompt, question prompt, and valid response. The account creation screen may include various fields specific to creating an account for a particular resource or group of resources.

For example, if the resource is a financial account, then the account creation screen may include a field for the account owner's name, financial account number, date of birth, as well as various other fields for collecting data about the account owner. In another example, if the resource is a kiosk for allowing the account owner to print a boarding pass, then the account creation screen may include fields to enter the account owner's frequent flyer information, name, and other such information.

Further, the account creation screen may also include a human test to detect whether the user, who is attempting to create an account, is human (i.e., as opposed to an automated software). For example, the human test may include a graphical text in which the text is blurred with a background so that only a human can identify the characters in the text. The human test may include a field for the user to submit the characters in the text or some biometric information.

Continuing with FIG. 2, an account identifier is obtained in accordance with one or more embodiments of the invention (Step 203). The account owner may submit the account identifier using the account creation screen or the account identifier may be assigned to the account owner. For example, the account owner may submit a preexisting identifier or a desired identifier. If the account owner submits a desired identifier, then a check may be performed to determine whether the desired identifier already exists.

In one or more embodiments of the invention, a determination is made whether to use media from the media library (Step 205). For example, the account owner may indicate a desire (e.g., by selecting a button, a link, a menu item, a stock media prompt, or by using any another command submission mechanism) to use an available stock media or personal media.

If a determination is made to not use media from the media library, then media, question(s), and valid response(s) are received from the account owner (Step 207). For example, the account owner may select a button to specify a storage location of the personal media in a personal media library. Next, the user uploads the media from the personal media library at the storage location specified. The personal media library may be on a computing device that is local (or remote) to the account owner. For example, the storage location may be at a network storage server, on a device connected to the computing device of the account owner, on the computing device of the account owner, or on any other computing device.

Further, the account owner may submit a question for the question prompt. In one or more embodiments of the invention, the account owner is instructed to provide a question that is personal to the account owner (i.e., requires personal knowledge) regarding the media prompt. In one or more embodiments of the invention, the account owner may type the question in a text box or select question from a set of stock questions. Similarly, the account owner may submit a valid response. In one or more embodiments of the invention, the account owner may also submit valid variations to the valid response, such as abbreviations for common words. Additionally, submitting the valid response may include assigning point values to one or more words/phrases deemed essential to correctly answering the question prompt.

Alternatively, if a determination is made to use a stock media, then the available stock media is presented to the account owner (Step 209). Specifically, the stock media is obtained from the media library and presented to the access account owner. The stock media prompts that are video or sound clip may be presented in a manner that the account owner may play the stock media. The stock media that are images may have a thumbnail displayed or the full image displayed.

In one or more embodiments of the invention, a selection of the stock media prompt, question prompt and valid response is received (Step 211). The account owner may select the stock media prompt, for example, by selecting a name of the stock media prompt, a thumbnail for the stock media prompt, a button associated with the stock media prompt, or performing any other action for specifying a virtual object. Further, the account owner may specify the question prompt(s) and the valid response(s) as discussed above in Step 207.

In one or more embodiments of the invention, the account owner may continue to submit media, questions, and valid responses depending on the amount of authentication desired. Further, the account owner may provide false media and false questions. The false media may be used to obfuscate which question and media combination is used to authenticate a user.

Further, the media as media prompt(s), the question(s) as question prompt(s), and the valid response(s) are stored with the account identifier to authenticate the user (Step 213). Specifically, the account data repository is updated with the media prompt, the question prompt, and the valid response. In one or more embodiments of the invention, if the media prompt is a stock media prompt, then a reference to the stock media prompt is stored in the account.

FIG. 3 shows a flowchart of a method for authentication in accordance with one or more embodiments of the invention. The authentication procedure described below may be used each time the user wants to log onto the resource or only when the user forgets a login password. For example, when presented with a user identifier and password link, the user may select a link indicating a forgotten password request. The method discussed below may allow the user to retrieve the user's password after receiving the forgotten password request. In the description below, the user may be the account owner, an individual permitted by the account owner to access the resource, a malicious individual, a malicious computer, or any other person or computing device.

Initially, an account identifier is received from the user (Step 231). The account identifier may be received, for example, using any technique known in the art. In one or more embodiments of the invention, an account identifier may be stored or associated with the computer device of the user. For example, when the user is previously authenticated, a cookie, or other such device may be stored on the user's computer device. The cookie may be associated with the account identifier. Thus, the cookie can be detected so that the user does not need to provide an account identifier. In one or more embodiments of the invention, the account identifier may be obtained based on recognition of the user's computing device. For example, the account identifier may be obtained by reading the caller identifier, obtaining a serial number (e.g., associated with the computing device), obtaining an internet protocol (IP) address, or obtaining any other identifying property or information that can reasonably be attributed to a specific user. Regardless of how the account identifier is obtained, the data repository may be accessed using the account identifier.

Next, a determination is made whether the account identifier is in the data repository (Step 233) in accordance with one or more embodiments of the invention. Specifically, a query specifying the account identifier and requesting the media prompt and the question prompt may be submitted to the data repository. In one or more embodiments of the invention, if no results are obtained from the query, then the determination is made that the account identifier is not in the data repository. In such a scenario, the user is denied access to the resource (Step 235). Denying access to the resource may include displaying a screen that allows the user to resubmit the account identifier. Those skilled in the art will appreciate that before denying access to the resource, the user may be asked whether the user wants to create a new account. If the user wants to create a new account, then the method may proceed as shown and described in association with FIG. 2.

Alternatively, if the account identifier is in the data repository, then the media prompt(s) and the related question prompt(s) are presented to the user (Step 237). If the media prompt is an image prompt, then the image is displayed for the user. If the media prompt is a video or sound clip, then the media prompt is played for the user. For example, the user may select a button to play the sound clip or video. Further, the question prompt is presented (e.g., played or displayed) for the user.

In one or more embodiments of the invention, false prompts are presented with the media prompt. Specifically, the media prompt is intermixed with the false prompts. More specifically, the media prompt may be placed in a random position with respect to the false prompts. In one or more embodiments of the invention, the false prompts are of the same type as the media prompt. For example, if the media prompt is an image, then the false prompts are also images.

Moreover, the false prompts may be question prompts. Specifically, the correct question may be intermixed in the false prompts. The false prompts provides an additional level of security because only the account owner knows which prompts are the false prompts and which prompt(s) is/are the media prompt and/or the question prompt.

Continuing with FIG. 2, the input from the user is received (Step 239). In one or more embodiments of the invention, the input is the user's answer to the question about the media.

Once the input is received, the input is compared with the valid response that requires personal knowledge of the media and the question (Step 241). Specifically, in one or more embodiments of the invention, only the account owner has the personal knowledge to correctly answer the question about the media. For example, consider the scenario in which the valid response is "blue pullover." A picture of a ski lift and the question "what do I wear?" may remind the account owner that the valid response phrase is "blue pullover" because the account owner always wears a blue pullover on the ski slopes. An unauthorized user, as opposed to the account owner, most likely has no idea what the account owner wears on the ski slopes, much less the color.

The valid response may also be a coded version of the correct answer to the media and question. For example, the valid response may be "blu3 pull0v3r" or other such variation of the actual correct answer to the question.

Comparing the input with the valid response may include identifying, for each the correct words or phrases in the valid response, the point values for the correct word or phrase. Further, the total number of points for the correct words or phrases may be calculated.

A determination is made whether the input is correct (Step 243). For example, if the total point value associated with the valid response is above a threshold number, then the input is deemed correct. Alternatively, the authentication engine may require an exact match to the valid response. If the input is an exact match, then the input is deemed correct.

When the input is correct, then the user is authorized to access the resource in accordance with one or more embodiments of the invention (Step 245). For example, the authentication engine may provide a token to the user interface and/or redirect the user interface to the resource.

When the input is not correct, then the user is denied access to the resource (Step 235). After a certain number of incorrect attempts, the account of the user may be disabled. In such scenario, the user may be required to provide additional information or use alternative mechanisms for re-enabling the account.

Although not shown in FIG. 3, if the user has previously been authenticated to a resource, then re-authentication may not be required. For example, a cookie stored on the computer system of the user may be used to identify and authenticate the user once the user has been authenticated.

FIGS. 4-11 show example user interfaces in accordance with one or more embodiments of the invention. The examples shown in FIGS. 4-8 are for exemplary purposes only and not intended to limit the scope of the invention. One skilled in the art will appreciate that alternative user interface components and devices may be used without departing from the scope of the invention. Further, the appearance of the user interface may be dependent on the computing device of the user and/or the resource being accessed. Thus, although FIGS. 4-8 show example user interface, those skilled in the art will appreciate that different user interfaces, which correspond to a specific computing device or the resource, may be used.

Figure 4:
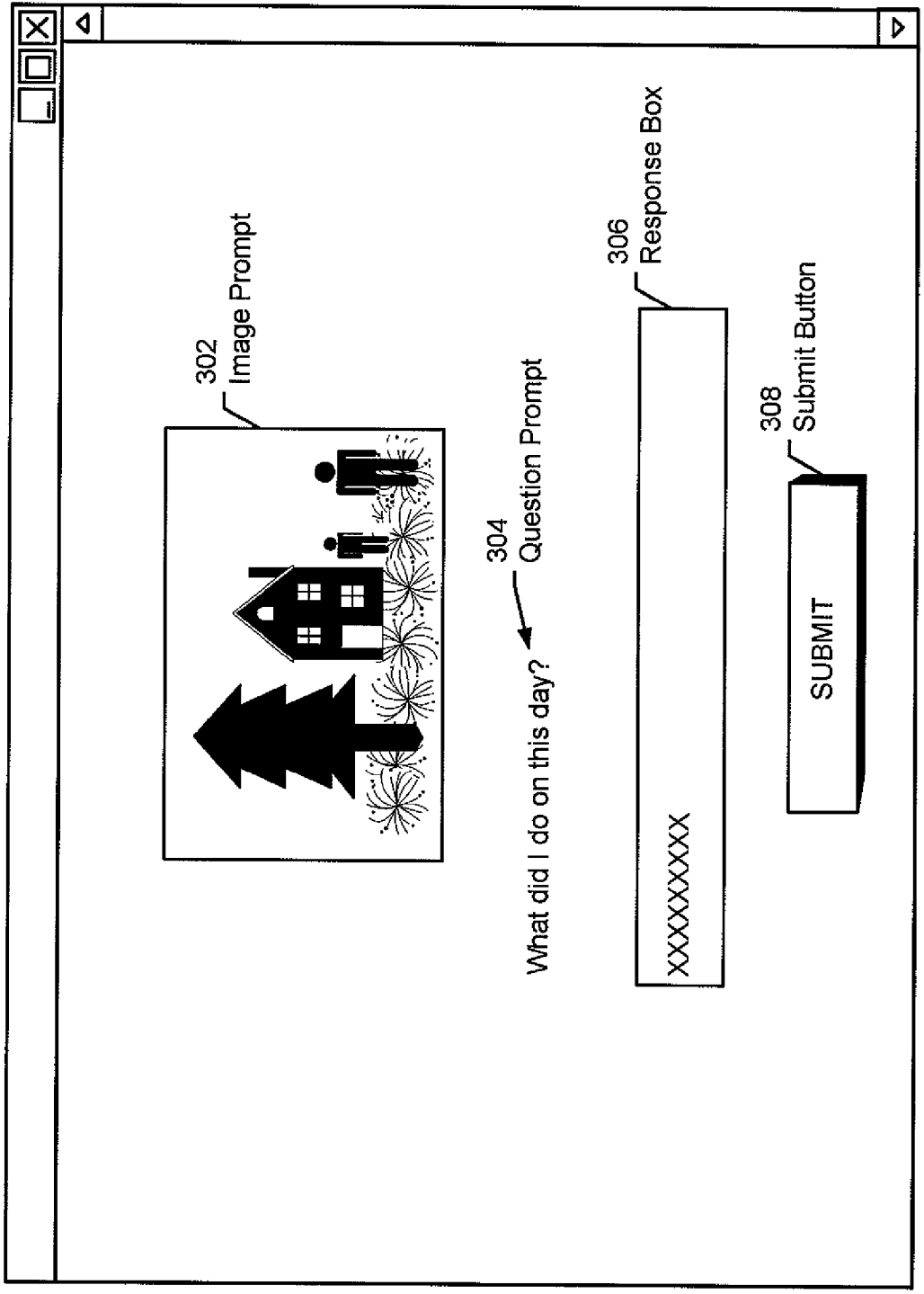
FIGS. 4-11 show example user interfaces in accordance with one or more embodiments of the invention.

FIG. 4 shows an example user interface (300) in which the media prompt is an image prompt (302) in accordance with one or more embodiments of the invention. Those skilled in the art will appreciate that although the image is a simple graphical drawing, the image prompt (302) may be a photograph, a complex drawing or any other type of graphical object. In this example, a question prompt (304) is displayed with the image prompt (302). The question prompt (304) references the image prompt (302) by asking a question about the displayed image. In the example, the question is "what happened on the day the photograph was taken?" The proper response requires that the account owner relate the image and question to the proper answer.

For example, although the image may show a photograph of a gathering at a friend's house, the account owner associates the photograph with more than just the person or location shown it the picture. In fact, the account owner knows that the photograph was taken while she was watching the New Years Day Parade with the friend. In the example, the account owner may type "New Years Day Parade" into the response box (306). A malicious user may see the same photograph and unsuccessfully try to gain access by typing "met friend in cottage house." Thus, the image provides a contextual reminder of the account owner's password without providing detail to a malicious user. Once the user (i.e., either the account owner or the malicious user) has typed in a response, the user selects the submit button (308). Upon selection of the submit button (308), the authentication engine determines that the account owner provided the correct answer and grants access. Meanwhile, the authentication engine determines that the malicious user provided an incorrect answer and is denied access.

Figure 5:
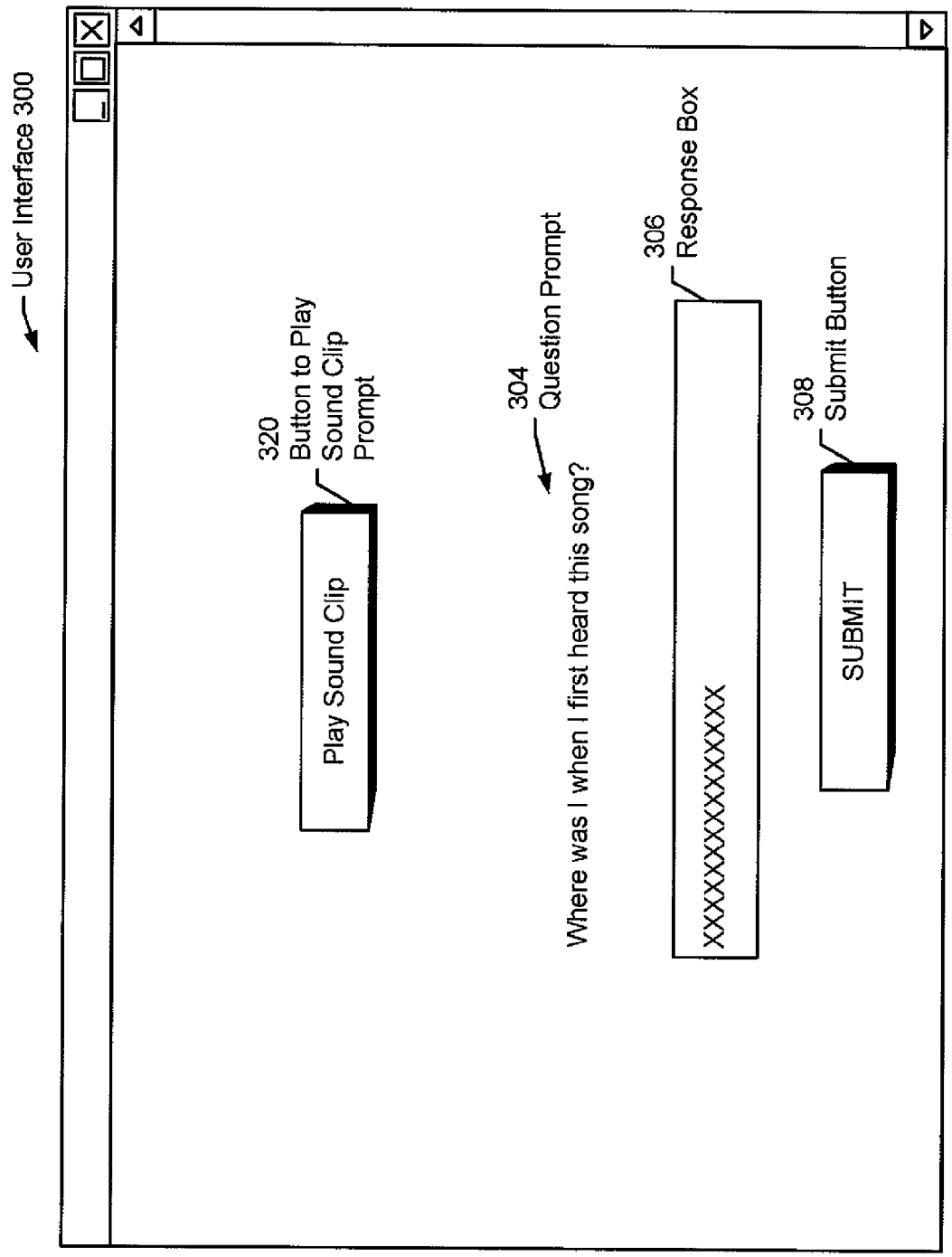

FIG. 5 shows an example user interface (300) in which the media prompt is a sound clip in accordance with one or more embodiments of the invention. In the example, the user interface (300) shown may include a button to play the sound clip prompt (320), a question prompt (304), a response box (306), and a submit button (308). As shown in the example, the account owner may specify a sound clip that corresponds to a song or a portion of a song. Further, the question prompt (304) may display a contextual question about the sound clip prompt (e.g., "Where was I when I first heard the song?"). After hearing the song, the account owner may remember that the song was played on the radio during a road trip to Mandan, N. Dak. Thus, the account owner may type "Road trip to Mandan, N. Dak." in the response box (306). A malicious user would likely never know where the account owner first heard a song and, therefore, unable to guess the proper response.

Figure 6:
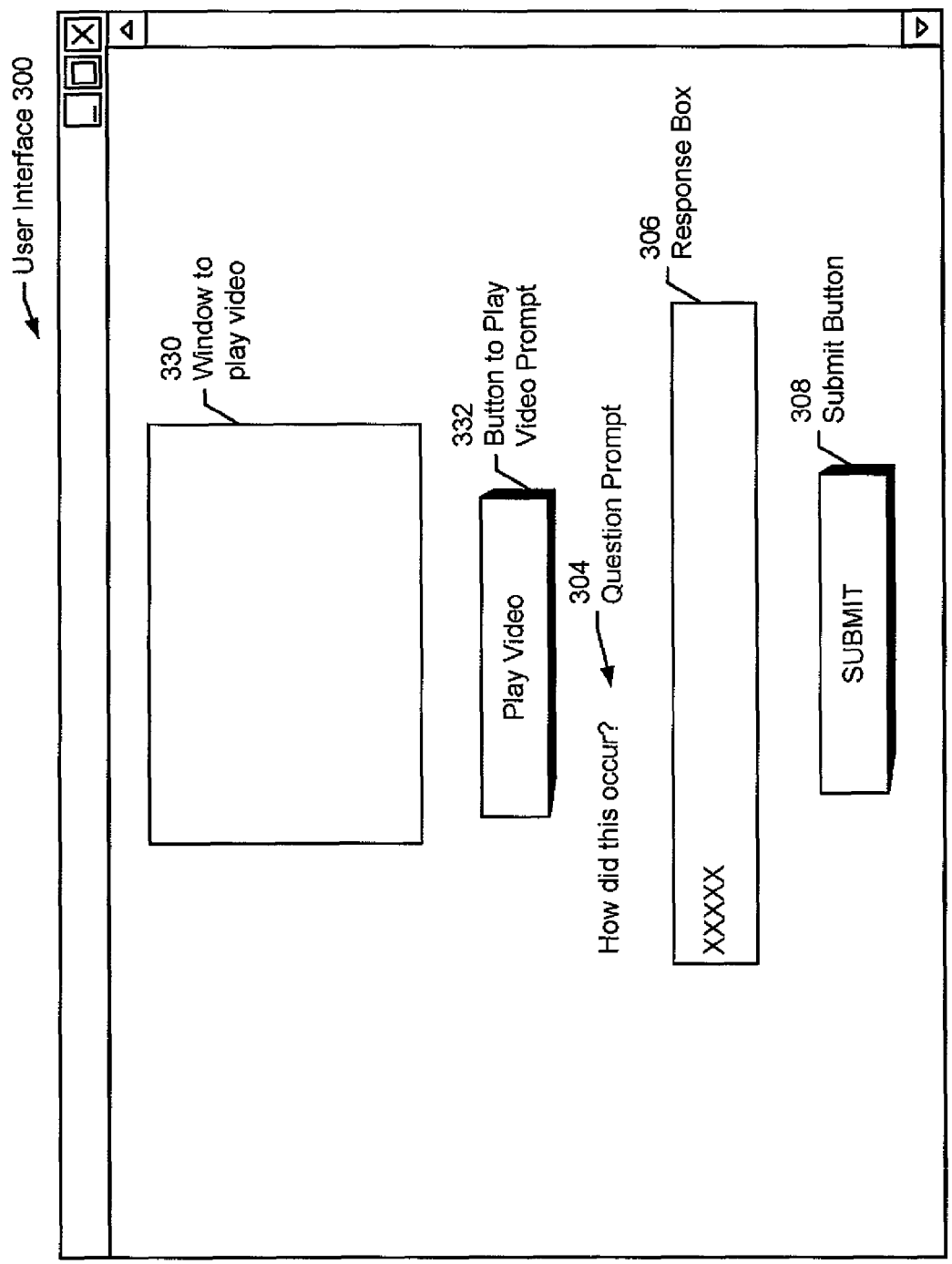

FIG. 6 shows an example user interface (300) in which the media prompt is a video in accordance with one or more embodiments of the invention. In the example shown, the user interface (300) may include a window to display a video prompt (330), a button to play the video prompt (332), a question prompt (304), a response box (306), and a submit button (308). As shown in the example, the account owner may specify a video and a question prompt that asks, "When did the action in the video occur?" For example, if the video shows an image of a person graduating, the question prompt (304) may display the question, "How did this occur?" The account owner who feels particularly indebted to a mentor would know that the valid answer is "Professor McDougall" and proceed to enter that answer into the response box (306) and click on the submit button (308). A malicious user may guess that the event occurred by "hard work" and, therefore, type "hard work" into the response box (306), which might be an obvious answer, but is wrong. As shown by the example, the account owner is reminded of the valid response through the use of the video and the contextual question. The malicious individual, however, is unable to relate the video and contextual question because the malicious user does not know the personal information required to answer the question.

Figure 7:
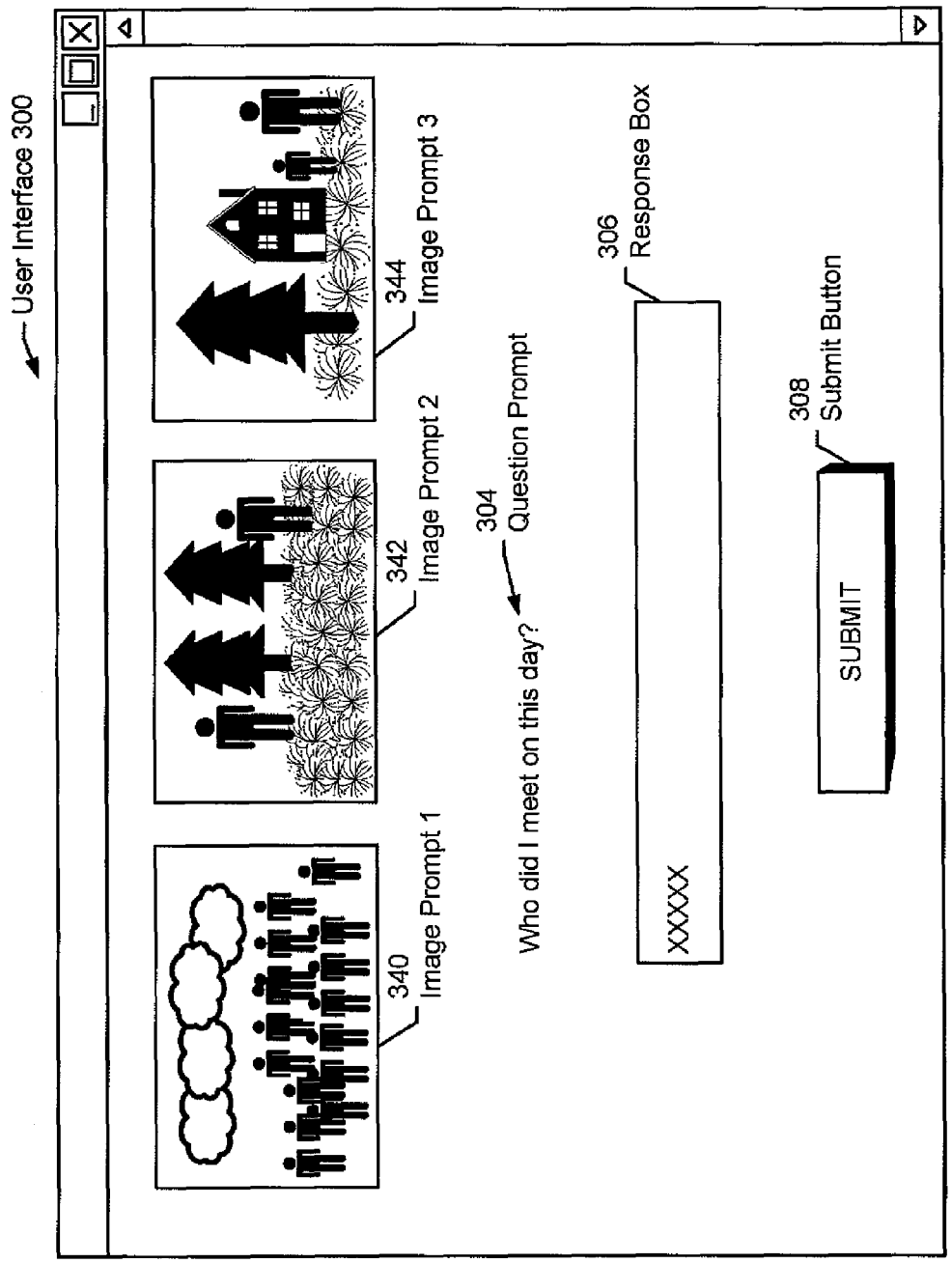

FIG. 7 shows an example user interface (300) in which false prompts are displayed with an image prompt. To a malicious user, the false prompts and the image prompt appears as three image prompts (i.e., image prompt 1 (340), image prompt 2 (342), image prompt 3 (344)). However, the account owner knows that image prompt 1 (340) and image prompt 2 (342) are false image prompts because those images are completely foreign to the account owner, while image prompt 3 (344) is a recognized image that the account owner has personally submitted or pre-selected prior to this authorization process. Accordingly, the account owner may proceed to answer the question "Who did I meet on this day?" in the question prompt (304) for image prompt 3 (344). The valid response may not be apparent from the image. For example, the valid response may be as outlandish as "a brown bear" even though the image is a photograph of two friends meeting at a friend's house (because, unknown to a malicious user, the friend owns a brown bear stuffed animal). The malicious user who sees the number of people in image prompt 1 (340) may think that image prompt 1 (340) is not a false prompt and answer the question with respect to image prompt 1 (340). Thus, the malicious user is denied access to the resource while the account owner is permitted to access the resource upon entering the valid response into the response box (306) and clicking on the submit button (308).

Figure 8:
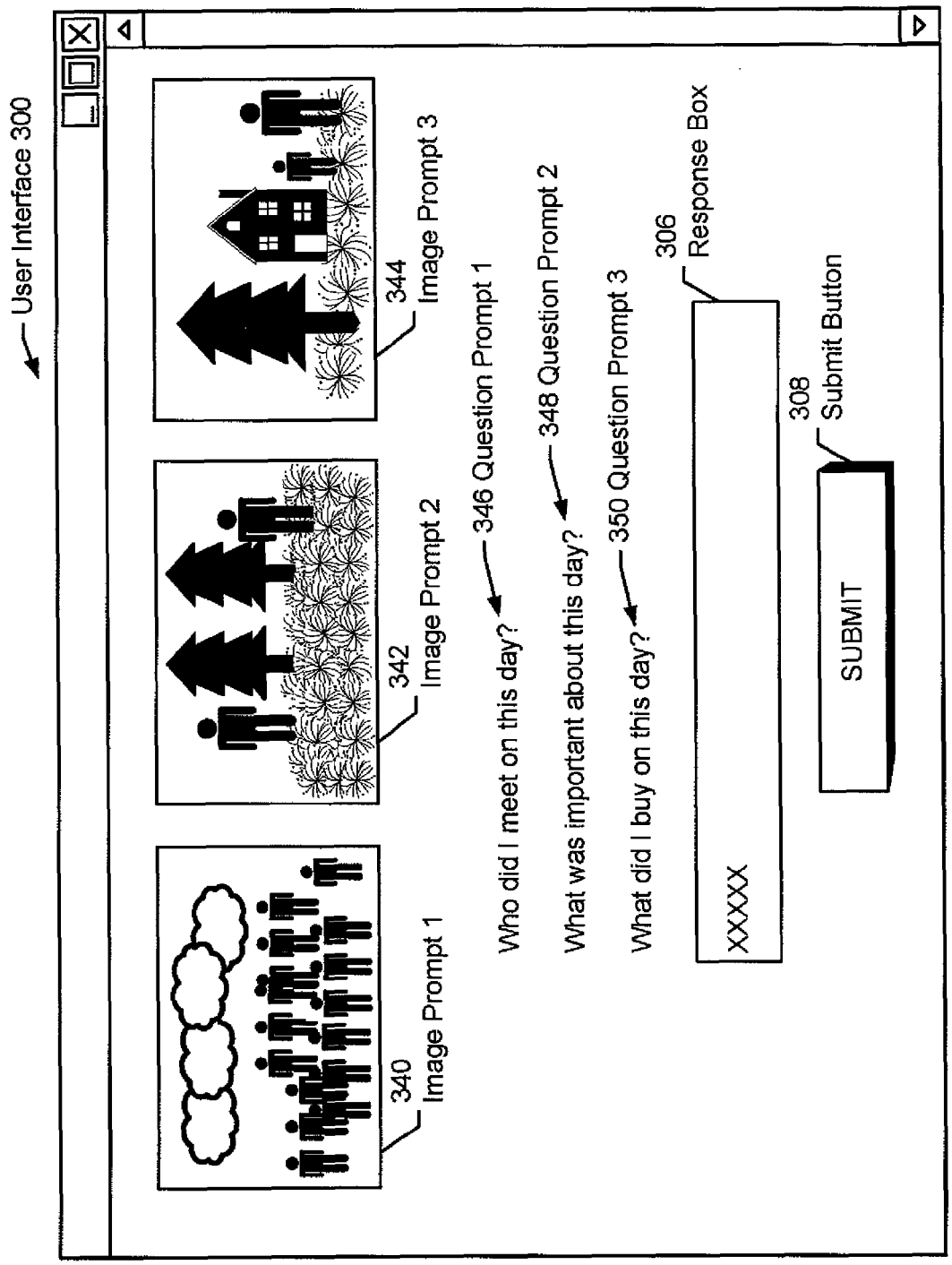

FIG. 8 shows an example user interface (300) in which false prompts are displayed with an image prompt and false image prompts are displayed with a question prompt. To a malicious user, the false image prompts and the proper image prompt appear as three image prompts (i.e., image prompt 1 (340), image prompt 2 (342), image prompt 3 (344)). However, as above, the account owner knows that image prompt 1 (340) and image prompt 2 (342) are false image prompts because those images are completely foreign to the account owner, while image prompt 3 (344) is a recognized image that the account owner has personally submitted or pre-selected prior to this authorization process. Similarly, to a malicious user, the false question prompts and the question prompt appear as three question prompts question prompt 1 (346), question prompt 2 (348), question prompt 3 (350)). However, the account owner knows that question prompt 2 (348) and question prompt 3 (350) are false question prompts because those questions are completely foreign to the account owner, while question prompt 1 (346) is a recognized question that the account owner has personally submitted or pre-selected prior to this authorization process.

Accordingly, the account owner may answer the question "Who did I meet on this day?" in the question prompt 1 (346) for image prompt 3 (344). Further, similar to FIG. 4, the valid response may not be apparent by the image. For example, the valid response may be "Shakespeare" even though the image is a photograph of two friends meeting at a friend's house. Specifically, the user may know that the user was introduced to the poetry of Shakespeare by the friend at that house on that day. The malicious user who sees the number of people in image prompt 1 (340) may think that image prompt 3 (344) is not a false prompt because it shows a cookie factory and improperly answers the question prompt 3 (350) with "cookies" by typing the word into the response box (306). Thus, the malicious user is denied access to the resource while the account owner is permitted to access the resource upon entering the valid response into the response box (306) and clicking on the submit button (308).

Figure 9:
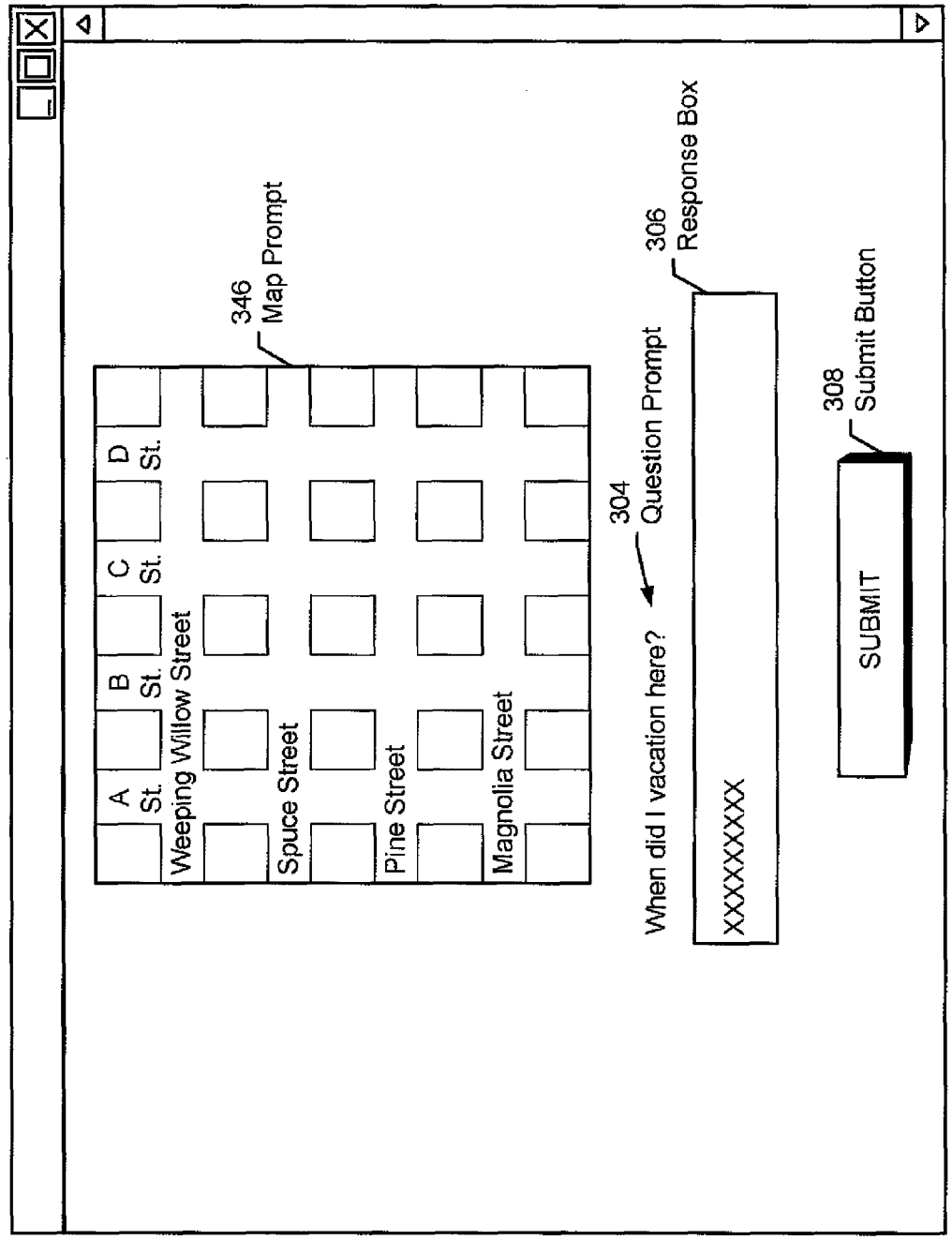

FIG. 9 shows an example user interface (300) in which the media prompt is an image prompt (302) showing a map in accordance with one or more embodiments of the invention. Those skilled in the art will appreciate that although the image is a simple map, the image prompt (302) may be a satellite image, a complex drawing, or any other type of graphical map. Further, although the map shows streets, the map may be a geological map showing geological formations, an elevation map, or any other type of map.

Continuing with FIG. 9, an account owner may define the map by merely specifying an address or region of the world. Based on the address or region, the authentication engine may generate the map. In this example, a question prompt (304) is displayed with the map. The question prompt (304) references the map by asking a question about the map. In the example, the question is "when did I vacation here?" The proper response requires that the user not only identify the location shown in the map, but also to identify when the account owner visited the location. The account owner will know that the location shown is the area he/she visits every summer to drink wine. So the account owner may type, "every summer" into the response box (306). The malicious user may see the same map and not know the location or the account owner's travel schedule. Thus, the malicious user would be unsuccessful when trying to gain access by typing "2003." Once the user (i.e., either the account owner or the malicious user) types in a response, the user selects the submit button (308). Upon selection of the submit button (308), the authentication engine determines that the account owner provided the correct answer and grants access. Meanwhile, the authentication engine determines that the malicious user provided an incorrect answer and is denied access.

Figure 10:
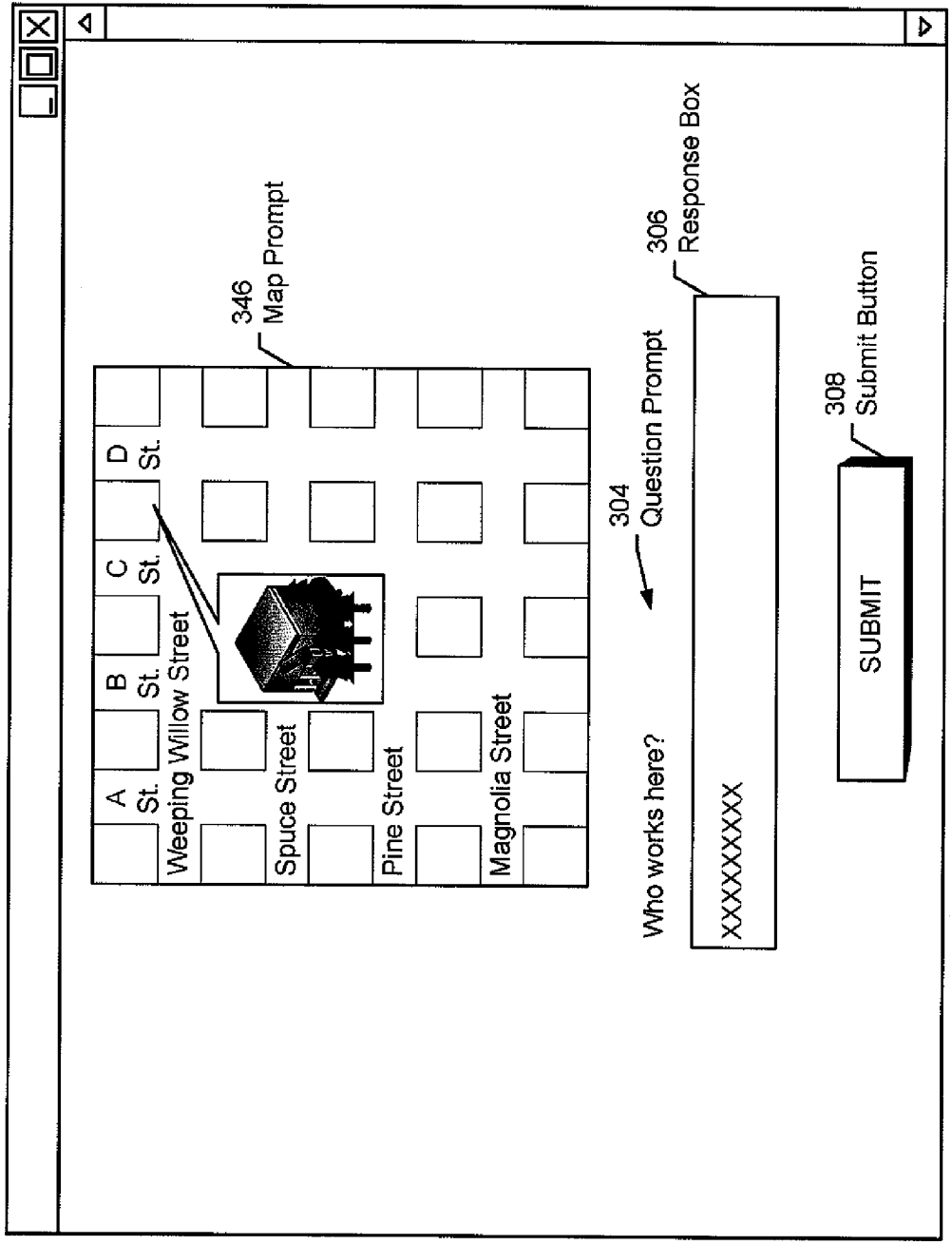

FIG. 10 shows an example user interface (300) in which the media prompt is an image prompt (302) showing a map with an image identifying a building in accordance with one or more embodiments of the invention. In this example, a question prompt (304) is displayed with the map.

In the example, the question about the map is "who works here?" The proper response requires that the user knows the employees at the particular building. The account owner may know that his drycleaner's son works in the building. So the account owner may type "drycleaner's son" into the response box (306). The malicious user may see the same building and, if the malicious user can correctly identify the building, the malicious user may begin submitting names of employees. However, the malicious user may not know the relationship of the account owner to one of the employees. Once the user (i.e., either the account owner or the malicious user) types in a response, the user selects the submit button (308). Upon selection of the submit button (308), the authentication engine determines that the account owner provided the correct answer and grants access. Meanwhile, the authentication engine determines that the malicious user provided an incorrect answer and is denied access.

Figure 11:
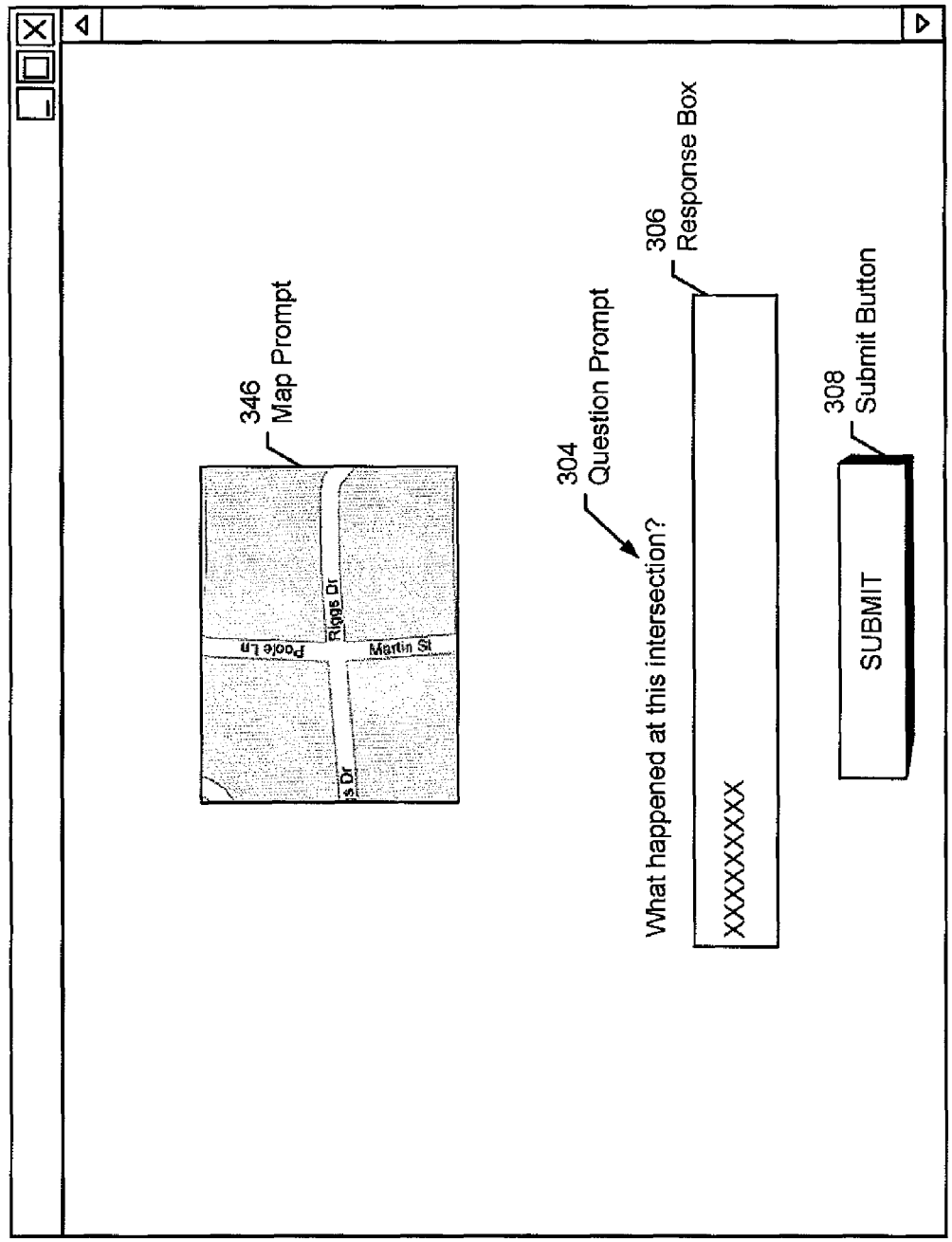

FIG. 11 shows an example user interface (300) in which the media prompt is an image prompt (302) showing an intersection of two streets in a map. In the example, the question about the map is "what happened at this intersection?" The proper response requires that the user knows the event that occurred at the intersection. The account owner may know that she delivered a baby at the intersection. So the account owner may type "baby born" into the response box (306). The malicious user may see the same intersection and only be able to guess, "accident." Thus, the malicious user may unsuccessfully try to gain access by typing "accident" into the response box (306). Once the user (i.e., either the account owner or the malicious user) type in a response, the user selects the submit button (308). Upon selection of the submit button (308), the authentication engine determines that the account owner provided the correct answer and grants access. Meanwhile, the authentication engine determines that the malicious user provided an incorrect answer and is denied access.

Figure 12:
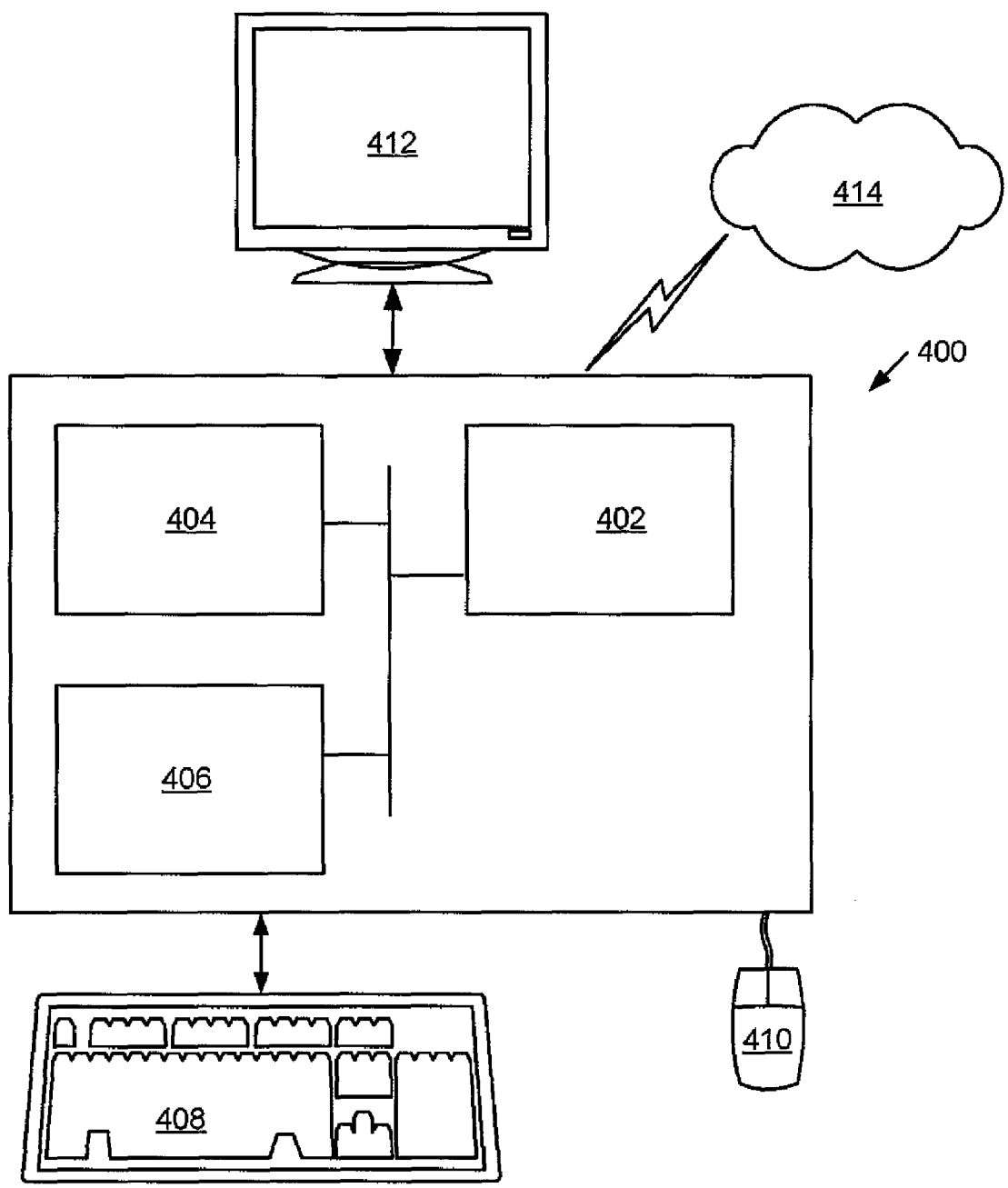
FIG. 12 shows a computer system in accordance with one or more embodiments of the invention.

Embodiments of the invention may be implemented on virtually any type of computer regardless of the platform being used. For example, as shown in FIG. 12, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., resource, authentication manager, data repository, computer system of the user, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for authenticating a user, comprising:
receiving an account identifier from the user;
obtaining a media prompt from an account based on the account identifier;
presenting the user with the media prompt intermixed in a plurality of false media prompts and a question prompt intermixed in a plurality of false question prompts,
wherein the media prompt depicts an image lacking an event,
wherein the question prompt presents a question asking about characteristics of the event absent from the image and known based on personal knowledge specific to the user,
wherein the false media prompts are of a same type of media as the media prompt,
wherein each false question prompt presents a false question, and
wherein the user knows which prompts are false question prompts and which prompts are false media prompts based on the personal knowledge specific to the user;
receiving input answering the question prompt, wherein the input is triggered by the user viewing the media prompt;
comparing, using a processor of a computer system, the input with a valid response to confirm an identity of the user, wherein the valid response requires the personal knowledge specific to the user with respect to the media prompt; and
authorizing the user to access a resource when the identity of the user is confirmed.

2. The method of claim 1, further comprising:
receiving a request indicating a forgotten password,
wherein the user is authenticated using the media prompt and the question prompt because of the request.

3. The method of claim 1, further comprising:
creating the account for an account owner, wherein the account owner defines the media prompt, the question prompt, and the valid response while creating the account.

4. The method of claim 1, wherein the media prompt comprises a plurality of images, wherein the plurality of images define a story.

5. The method of claim 3, further comprising:
obtaining a plurality of available stock media from a media library; and
presenting the account owner with the plurality of available stock media, wherein the account owner defines the media prompt by selecting the available stock media from the plurality of available stock media prompt.

6. The method of claim 3, wherein the account owner defines the media prompt by referencing media from a personal media library.

7. A system for authenticating a user, comprising:
an account associated with an account owner and stored in a repository,
wherein the account is linked to a media prompt, a question prompt, and a valid response,
wherein the media prompt depicts an image lacking an event, and
wherein the question prompt presents a question asking about characteristics of the event absent from the image and known based on personal knowledge specific to the user and the valid response is pre-selected by the account owner responsive to the question; and
an authentication manager accessing the account, executing on a processor, and configured to:
receive an account identifier from the user;
obtain the media prompt from the account based on the account identifier;
present the user with the media prompt intermixed in a plurality of false media and the question prompt intermixed in a plurality of false question prompts,
wherein the false media prompts are of a same type of media as the media prompt,
wherein each false question prompt presents a false question, and
wherein the user knows which prompts are false question prompts and which prompts are false media prompts based on the personal knowledge specific to the user;
receive input answering the question prompt, wherein the input is triggered by the user viewing the media prompt;
compare the input with the valid response to confirm an identity of the user, wherein the valid response requires the personal knowledge specific to the user with respect to the media prompt; and
authorize the user to access a resource when the identity of the user is confirmed.

8. The system of claim 7, wherein the authentication manager is further configured to:
receive a request indicating a forgotten password, wherein the user is authenticated using the media prompt and the question prompt because of the request.

9. The system of claim 7, wherein the authentication manager is further configured to:
create the account for the account owner, wherein the account owner defines the media prompt, the question prompt, and the valid response while creating the account.

10. The system of claim 7, wherein the media prompt comprises a plurality of images, wherein the plurality of images define a story.

11. The system of claim 9, further comprising:
a media library comprising a plurality of available stock media,
wherein the authentication engine is further configured to:
obtain the plurality of available stock media from the media library; and
present the plurality of available stock media to the account owner, wherein the account owner defines the media prompt by selecting an available stock media from the plurality of available stock media prompt.

12. The system of claim 9, wherein the account owner defines the media prompt by referencing media from a personal media library.

13. A user interface generated by instructions executing on a processor and displayed on a display device, the user interface comprising:
a plurality of false media prompts;
a media prompt, intermixed in the plurality of false media prompts, depicting an image lacking an event, wherein the media prompt is of a same type of media as the false media prompts, and wherein the user knows which prompts are false media prompts based on personal knowledge specific to the user;
a plurality of false question prompts each presenting a false question;
a question prompt, intermixed in the plurality of false question prompts, presenting a question asking about characteristics of the event absent from the image and known based on the personal knowledge specific to the user, and wherein the user knows which prompts are false question prompts based on the personal knowledge specific to the user; and
an input box for receiving input from the user viewing the display device, wherein the input is triggered by the user viewing the media prompt, wherein the input is compared with a valid response to confirm an identity of the user, wherein the valid response requires the personal knowledge specific to the user with respect to the media prompt, wherein the user is authorized to access a resource when the identity of the user is confirmed.

14. A computer system for authenticating a user, comprising:
a processor;
a memory;
a storage device; and
software instructions stored in the memory for enabling the computer system under control of the processor, to:
receive an account identifier from the user;
obtain a media prompt from an account based on the account identifier, wherein the media prompt depicts an image lacking an event;
present the user with the media prompt and intermixed in a plurality of false media prompts and a question prompt intermixed in a plurality of false question prompts,
wherein the question prompt presents a question asking about characteristics of the event absent from the image and known based on personal knowledge specific to the user,
wherein the false media prompts are of a same type of media as the media prompt,
wherein each false question prompt presents a false question, and
wherein the user knows which prompts are false question prompts and which prompts are false media prompts based on the personal knowledge specific to the user;
receive input answering the question prompt, wherein the input is triggered by the user viewing the media prompt;

compare the input with a valid response to confirm an identity of the user, wherein the valid response requires the personal knowledge specific to the user with respect to the media prompt as related to the user; and authorize the user to access a resource when the identity of the user is confirmed.

15. The computer system of claim 14 further comprising:

a display device configured to display the media prompt, the question prompt, and an input box for receiving input from the user viewing the display device.

16. A non-transitory computer readable medium comprising computer readable program code for authenticating a user, the computer readable program code for causing the computer system to:

receive an account identifier from the user;

obtain a media prompt from an account based on the account identifier, wherein the media prompt depicts an image lacking an event;

present the user with the media prompt intermixed in a plurality of false media prompts and a question prompt intermixed in a plurality of false question prompts, wherein the question prompt presents a question asking about characteristics of the event absent from the image and known based on personal knowledge specific to the user, wherein the false media prompts are of a same type of media as the media prompt, wherein each false question prompt presents a false question, and wherein the user knows which prompts are false question prompts and which prompts are false media prompts based on the personal knowledge specific to the user;

receive input answering the question prompt, wherein the input is triggered by the user viewing the media prompt;

compare the input with a valid response to confirm an identity of the user, wherein the valid response requires the personal knowledge specific to the user with respect to the media prompt; and authorize the user to access a resource when the identity of the user is confirmed.

17. The non-transitory computer readable medium of claim 16, wherein the computer readable program code further causes the computer system to:

create the account for an account owner, wherein the account owner defines the media prompt, the question prompt, and the valid response while creating the account.

18. The non-transitory computer readable medium of claim 17, wherein the computer readable program code further causes the computer system to:

obtain a plurality of available stock media from a media library; and present account owner with the plurality of available stock media, wherein the account owner defines the media prompt by selecting an available stock media from the plurality of available stock media prompt.

* * * * *

UNITED STATES PATENT AND TRADEMARK OFFICE
CERTIFICATE OF CORRECTION

| | | |
|---|---|---|
| PATENT NO. | : 8,151,343 B1 | Page 1 of 1 |
| APPLICATION NO. | : 12/112794 | |
| DATED | : April 3, 2012 | |
| INVENTOR(S) | : Henry Shyue-yeong Wang et al. | |

It is certified that error appears in the above-identified patent and that said Letters Patent is hereby corrected as shown below:

- In Claim 7, Column 15 (line 32), --prompts-- should be added after "media".

Signed and Sealed this
Twenty-ninth Day of May, 2012

David J. Kappos
*Director of the United States Patent and Trademark Office*